(12) United States Patent
Tsai

(10) Patent No.: US 7,344,113 B2
(45) Date of Patent: Mar. 18, 2008

(54) TOOL HOLDER HAVING A CLAMPING HOLE

(75) Inventor: Chin-Chang Tsai, Taichung (TW)

(73) Assignee: Gau Woei Super Hard Tool Co., Ltd., Nan-Tun District., Taichung (TW)

( * ) Notice: Subject to any disclaimer, the term of this patent is extended or adjusted under 35 U.S.C. 154(b) by 17 days.

(21) Appl. No.: 11/364,853

(22) Filed: Feb. 27, 2006

(65) Prior Publication Data

US 2007/0200044 A1   Aug. 30, 2007

(51) Int. Cl.
*A47F 5/02* (2006.01)
(52) U.S. Cl. ............... 248/131; 248/407; 248/551; 248/71; 248/500; 248/158; 248/176.1; 248/309.1; 483/2; 483/3
(58) Field of Classification Search ........ 248/131, 248/158, 176.1, 407, 309.1; 220/628, 629, 220/630; 483/2, 3
See application file for complete search history.

(56) References Cited

U.S. PATENT DOCUMENTS

| | | | | |
|---|---|---|---|---|
| 2,670,963 A | * | 3/1954 | Osborn | 279/53 |
| 2,735,685 A | * | 2/1956 | Karr | 279/44 |
| 4,020,555 A | * | 5/1977 | Hendrick | 30/392 |
| 4,083,112 A | * | 4/1978 | Palm | 30/335 |
| 4,729,473 A | * | 3/1988 | Kulzer et al. | 206/477 |
| 5,575,071 A | * | 11/1996 | Phillips et al. | 30/392 |
| 5,661,909 A | * | 9/1997 | Kondo et al. | 30/392 |
| 5,713,467 A | * | 2/1998 | Kao | 206/349 |
| 6,120,462 A | * | 9/2000 | Hibner et al. | 600/566 |
| 6,209,208 B1 | * | 4/2001 | Marinkovich et al. | 30/392 |
| 6,241,208 B1 | * | 6/2001 | Lin | 248/309.1 |
| 6,464,840 B1 | * | 10/2002 | McCann | 206/349 |
| 6,543,958 B2 | * | 4/2003 | Huang | 403/292 |
| 6,612,039 B2 | * | 9/2003 | Kakiuchi et al. | 30/392 |
| 6,725,548 B1 | * | 4/2004 | Kramer et al. | 30/392 |
| 6,754,967 B2 | * | 6/2004 | Lovell et al. | 30/517 |
| 6,837,373 B2 | * | 1/2005 | Huang | 206/376 |
| 6,874,630 B2 | * | 4/2005 | Lin Wu | 206/349 |
| 7,024,779 B1 | * | 4/2006 | Wright | 30/371 |
| 7,040,023 B2 | * | 5/2006 | Nemazi et al. | 30/392 |
| 7,055,689 B2 | * | 6/2006 | Chen | 206/376 |
| 2002/0175257 A1 | * | 11/2002 | Yen | 248/309.1 |

* cited by examiner

*Primary Examiner*—Brian E. Glessner
*Assistant Examiner*—Michael McDuffie
(74) *Attorney, Agent, or Firm*—Law Offices of Albert Wai-Kit Chan, PLLC

(57) ABSTRACT

A tool holder includes a base body having a through hole and a tubular clamp rotatable between first and second positions. The tubular clamp has a plurality of axially extending split parts which extend through the through hole and which define a clamping hole to clamp a cutter. The split parts are resilient to move inward or outward. A plurality of push elements are formed on the base body to push the split parts inward when the tubular clamp is in the first position. The split parts are released when moving from the push elements in the second position of the tubular clamp.

9 Claims, 10 Drawing Sheets

TOOL HOLDER HAVING A CLAMPING HOLE

BACKGROUND OF THE INVENTION

1. Field of the Invention

The invention relates to a tool holder, more particularly to a cutter holder having a clamping hole for clamping a cutter.

2. Description of the Related Art

Referring to FIG. 1, a cutter 1 includes a stem 11 to be clamped by a conventional tool holder 2, and a cutter blade 12 for processing workpieces by cutting, shaving, drilling, etc. Since the cutter blade 12 is considerably sharp and can injure the users, the cutter 1 is inserted into a socket 21 of the tool holder 2 when it is on standby or display. However, in order to hold the stem 11 firmly, the socket 21 of the tool holder 2 is provided with a dimension that can fit the cutter 1 tightly in the socket 21. Therefore, when the user needs to remove the stem 11 from the socket 21, the user must apply substantial forces to the stem 11 by gripping an exposed part of the stem 11. Since the exposed part of the stem 11 that can be gripped by the user is small, there are chances that the user will touch inadvertently the cutter blade 12 and get hurt. The tool holder 2 is thus unsafe and inconvenient to use.

SUMMARY OF THE INVENTION

Therefore, an object of the present invention is to provide a tool holder with a clamping hole that can be tightened or loosened to clamp or release a tool such as a cutter.

According to this invention, a tool holder comprises a base body having a through hole, and a tubular clamp rotatable between first and second positions. The tubular clamp includes a plurality of axially extending split parts which extend through the through hole and which are spaced apart angularly to define a clamping hole that is adapted to receive a cutter. The split parts are resilient to move inward or outward. The tool holder further includes a plurality of push elements formed on the base body. The push elements push the split parts inward when the tubular clamp is rotated to the first position, and release the split parts when the tubular clamp is rotated to the second position.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
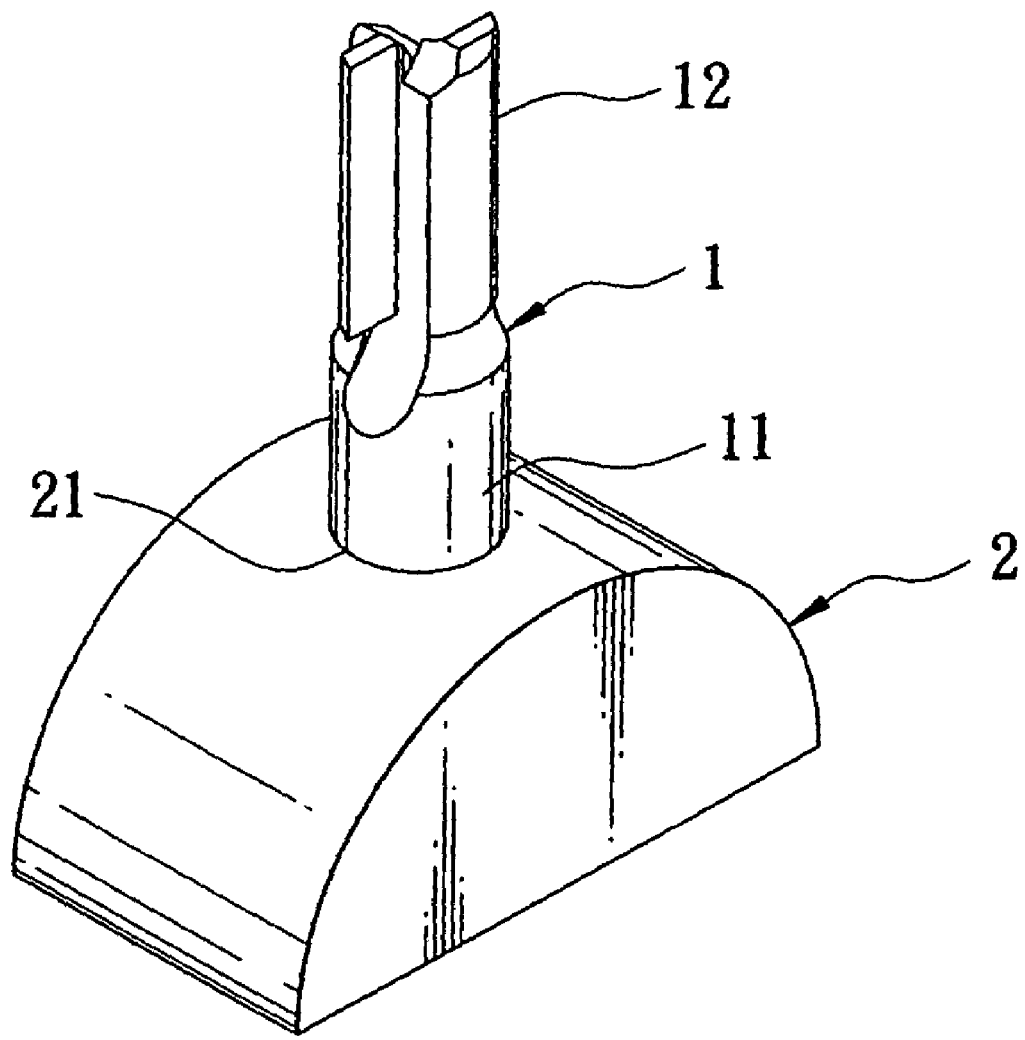
FIG. 1 shows a conventional tool holder.

Referring to FIGS. 2-9, the first preferred embodiment of a tool holder according to the present invention includes a base body 3, a tubular clamp 5 inserted rotatably into the base body 3, a rotary member 4 integral with the tubular clamp 5 and mounted rotatably on the base body 3 so as to rotate the tubular clamp 5. A casing 7 is disposed on top of the rotary member 4 to define an enclosed space to receive partially a tool, such as a cutter 1 which has a blade 12 and a stem 11.

Figure 2:
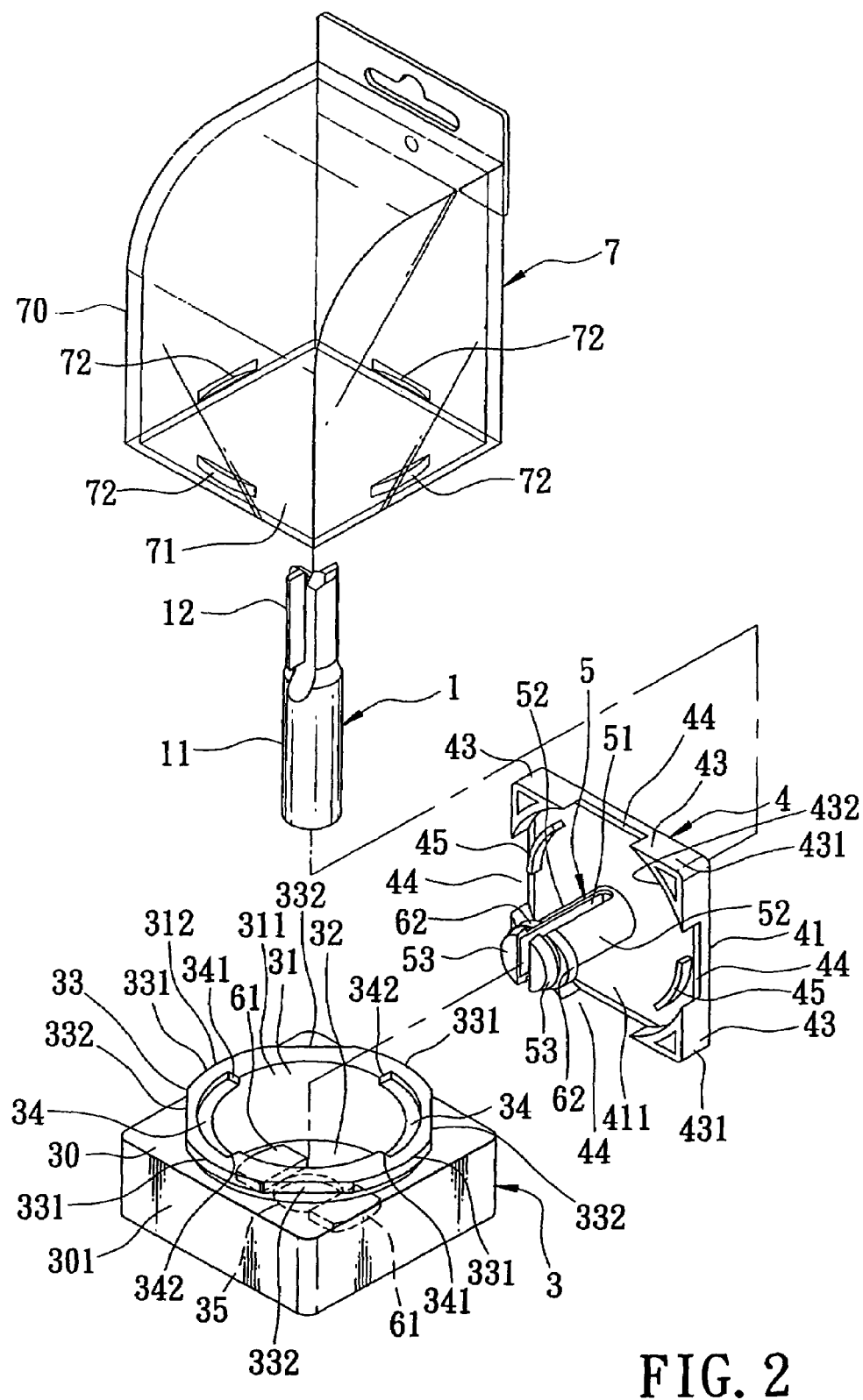
FIG. 2 is an exploded view of a tool holder according to the first preferred embodiment of the present invention.
Figure 6:
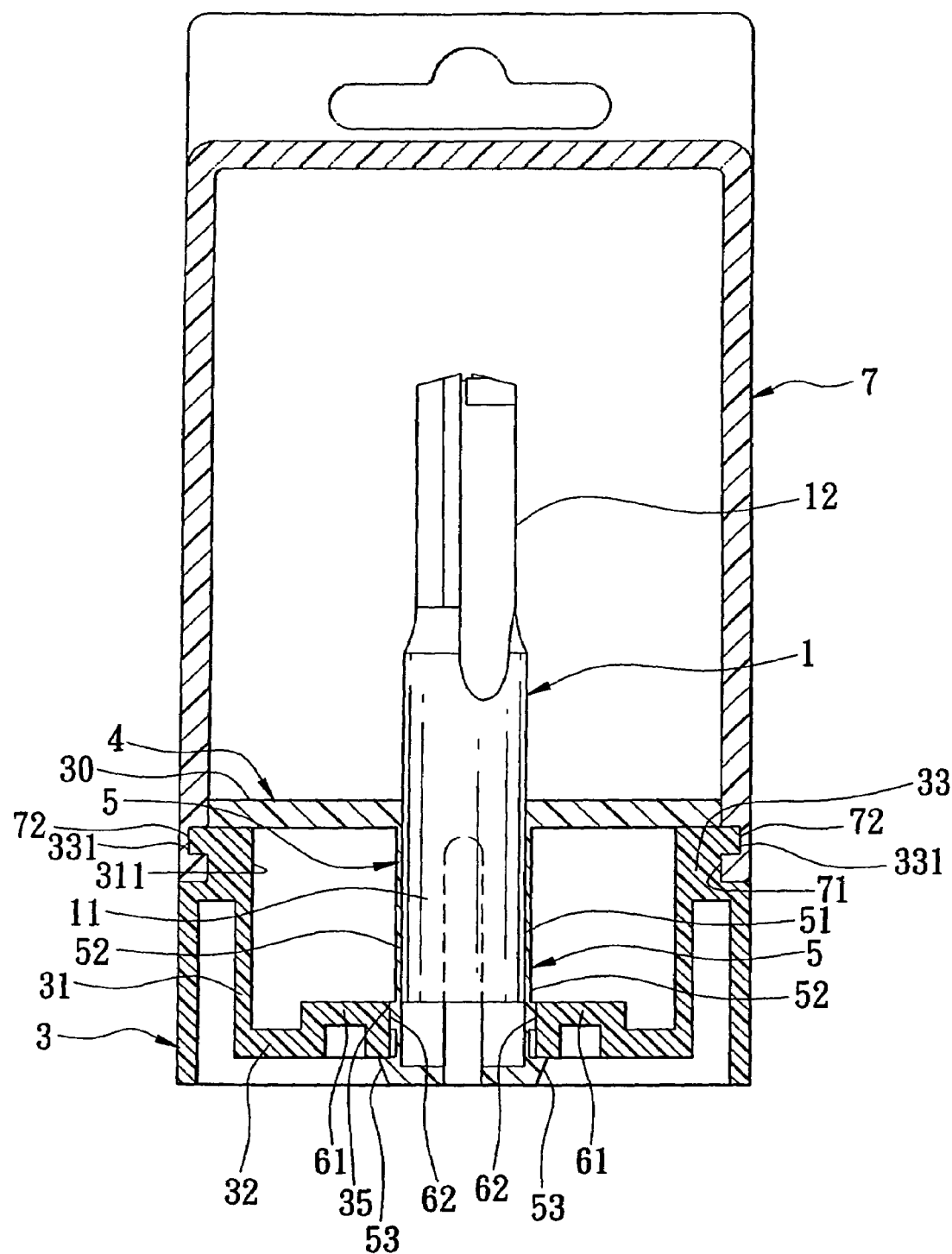
FIG. 6 is a sectional view taken along line 6-6 of FIG. 3.

As best shown in FIGS. 2 and 6, the base body 3 includes a rectangular top wall 30, a bottom wall 32, an inner cylindrical wall 31 extending upward from the bottom wall 32 and penetrating the top wall 30, and an outer four-sided wall 301 extending laterally and downwardly from the top wall 30 at the outside of the inner cylindrical wall 31. The bottom wall 32 is provided with a through hole 35. A portion of the inner cylindrical wall 31 forms a ring member 33 that projects upward from the top wall 30 and that is coaxial with the through hole 35. A pair of push elements or push blocks 61 project upward from a top side of the bottom wall 32 on two opposite sides of the through hole 35.

The ring member 33 has an inner annular wall 311, and an outer peripheral wall 312. The inner annular wall 311 is provided with two arcuate slide grooves 34, whereas the outer peripheral wall 312 is provided with four spaced apart arcuate surfaces 331 that extend angularly and coaxially with the through hole 35, and four spaced apart flat chordal surfaces 332 each extending between two adjacent arcuate surfaces 331. Each arcuate slide groove 34 has a first end 341, and a second end 342.

The rotary member 4 has a rectangular cover plate 41 disposed on the top wall 30 of the base body 3. The cover plate 41 is four-sided, and has an opening 42, and an engaging unit to connect rotatably with the ring member 33 of the base body 3. The engaging unit includes four corner pieces 43 that project downward from four corners of the cover plate 41. Each corner piece 43 has a right-angled corner wall 431, and an arcuate wall 432 extending inwardly of and connected to the right-angled corner wall 431. The arcuate walls 432 of the corner pieces 43 extend angularly and coaxially with the through hole 35 of the base body 3 and are able to contact slidably the arcuate surfaces 331 of the outer peripheral wall 312 of the ring member 33. The engaging unit further includes a pair of arcuate slide ribs 45 that project downward from a bottom side 411 of the cover plate 41 and that extend slidably into the arcuate slide grooves 34, respectively. Four notches 44 are formed between the right-angled corner walls 431 of the corner pieces 43.

The tubular clamp 5 is formed as one-piece with the rotary member 4. A top open end of the tubular clamp 5 is connected integrally to the cover plate 41 and is communicated with the opening 42 of the cover plate 41. The tubular clamp 5 includes a pair of axially extending split parts 52 of arcuate cross-section, which are spaced apart angularly to define a clamping hole 51 and which project downward from the cover plate 41 to extend through the ring member 33 and the through hole 35 of the base body 3. Each split part 52 has a bottom end formed with a barb 53 that projects outwardly to engage a bottom side of the bottom wall 32 of the base body 3, and a rounded protrusion 62 that projects outwardly therefrom on top of the bottom wall 32.

The casing 7 has a surrounding wall 70 with a bottom open end 71 connected detachably to the cover plate 41. In particular, the bottom open end 71 is four-sided and is fitted around the four corner pieces 43 of the cover plate 41 so that the cover plate 41 can be rotated by turning the casing 7. Four recesses 72 are formed in an inner surface of the bottom open end 71 of the casing 7 to engage the ring member 33.

In assembly, the cover plate 41 is mounted rotatably on the top wall 30 of the base body 3 by extending the tubular clamp 5 through the through hole 35 of the bottom wall 32 and by engaging the ring member 33 with the arcuate walls 432 of the corner pieces 43 in a slidable position. Since the split parts 52 are resilient to move inward or outward and since the barbs 53 taper downward, the split parts 52 can be inserted easily into the through hole 35.

In use, the stem 11 of the cutter 1 is inserted into the clamping hole 51 of the tubular clamp 5. The bottom open end 71 of the casing 7 is fitted around the cover plate 4, and is placed in abutment with the top wall 30 of the base body 3. The cover plate 41 may be turned relative to the ring member 33 to a position in which the arcuate surfaces 331 of the ring member 33 project respectively into the notches 44 of the cover plate 41 (see FIG. 3), or to another position in which the flat chordal surfaces 332 are aligned with the notches 44 of the cover plate 41 (see FIG. 4).

Figure 3:
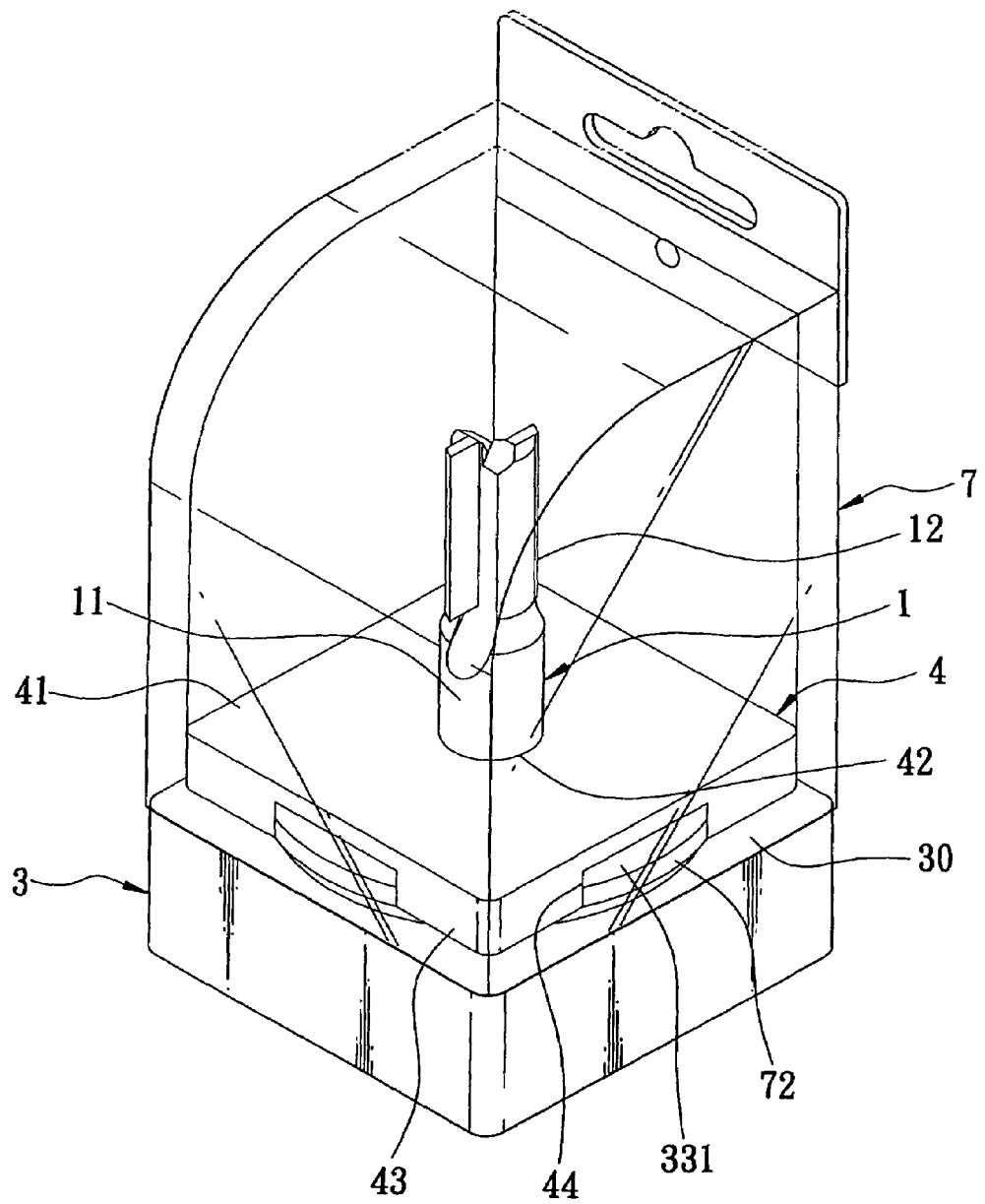
FIG. 3 is a perspective view of the tool holder of FIG. 2.
Figure 4:
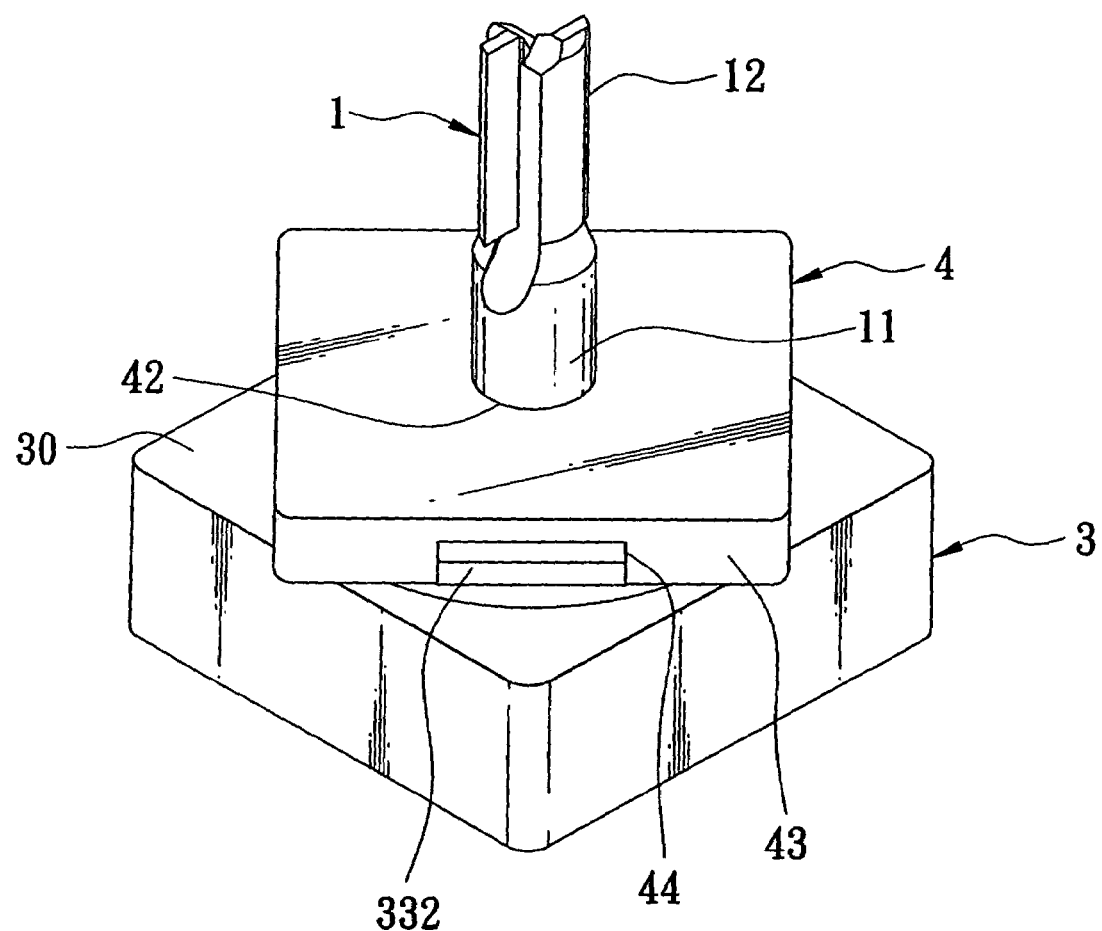
FIG. 4 is the same view as FIG. 3 but with a casing of the tool holder being removed and with a tubular clamp of the tool holder being placed in a second position.
Figure 5:
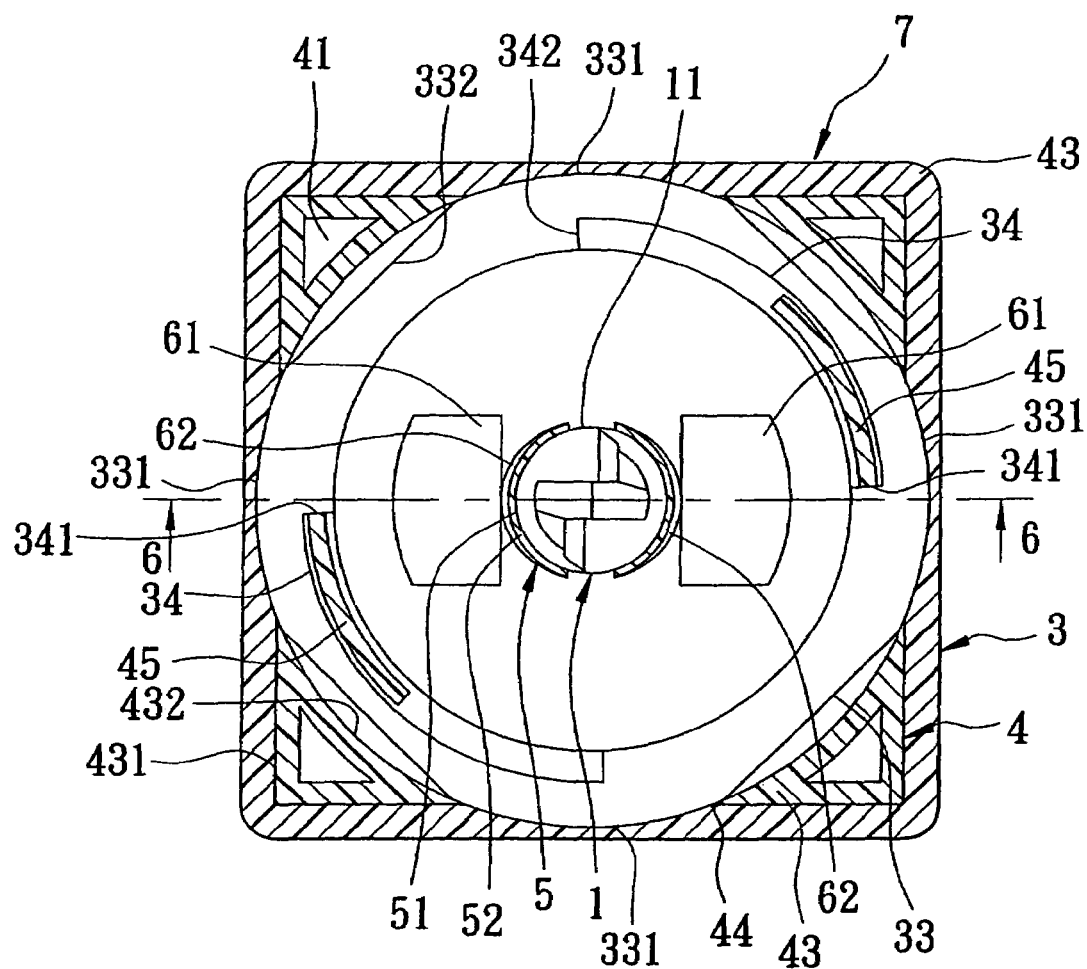
FIG. 5 is a sectional plan view of the tool holder of FIG. 3.

The cover plate 41 may be turned by rotating the casing 7. When the cover plate 41 is turned, the arcuate walls 432 of the corner pieces 43 slide along the arcuate surfaces 331 of the ring member 33, and the arcuate slide ribs 45 slide within the arcuate slide grooves 34, respectively. When the arcuate slide ribs 45 are slid to the first ends 341 of the respective slide grooves 34, the tubular clamp 5 is rotated to a first position in which the protrusions 62 of the split parts 52 are located between the two push blocks 61, as shown in FIGS. 5 and 6. The split parts 52 are therefore pressed inward by the push blocks 61, thereby clamping tightly the stem 11 of the cutter 1. In this first position, the arcuate surfaces 331 protrude outward through the respective notches 44 and engage the respective recesses 72 of the casing 7, as shown in FIG. 3. The casing 7 is thus prevented from being released from the cover plate 41, and the cutter 1 is clamped tightly by the tubular clamp 5.

Figure 7:
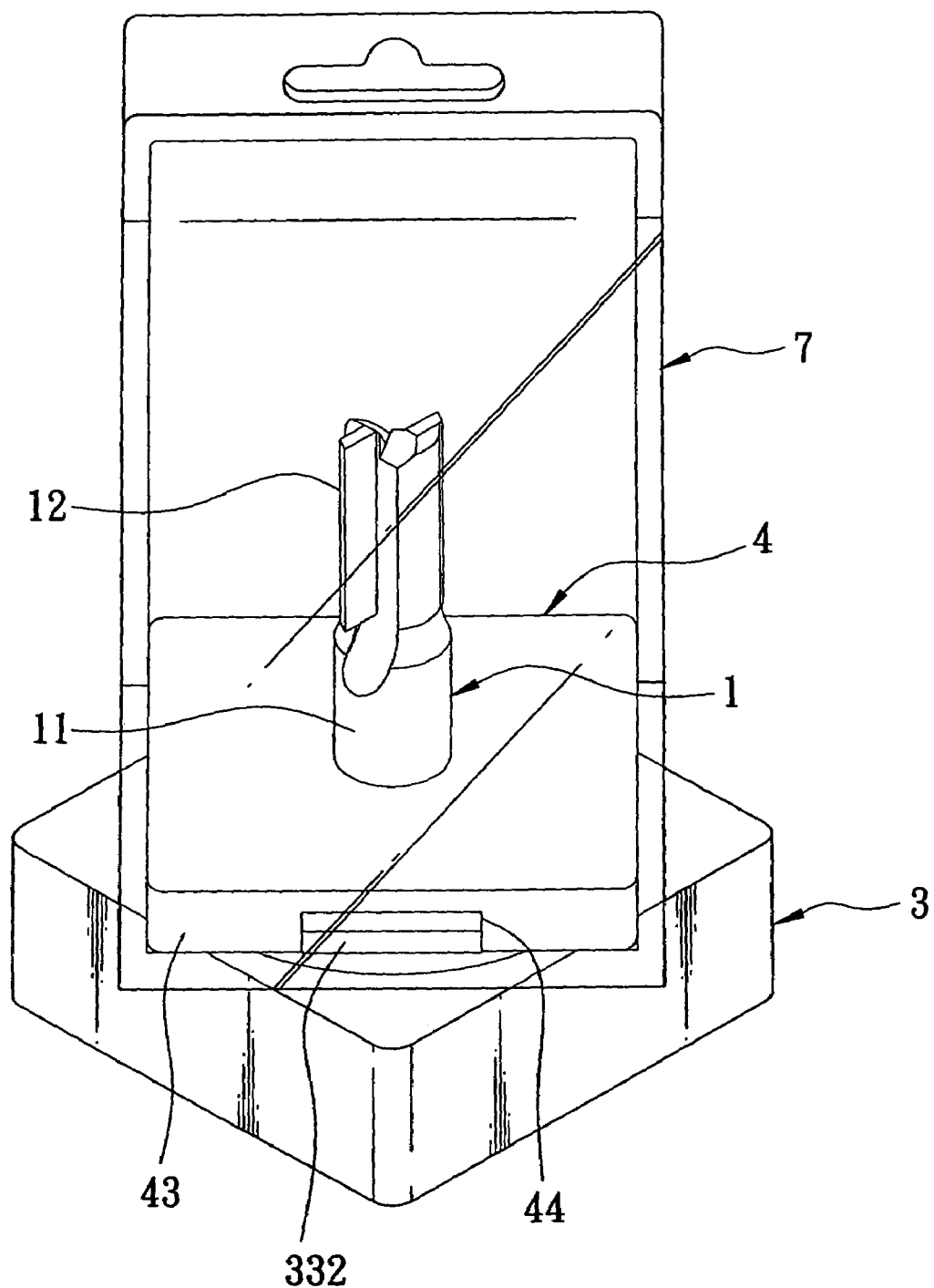
FIG. 7 is the same view as FIG. 3 but with the tubular clamp being placed in a second position.
Figure 8:
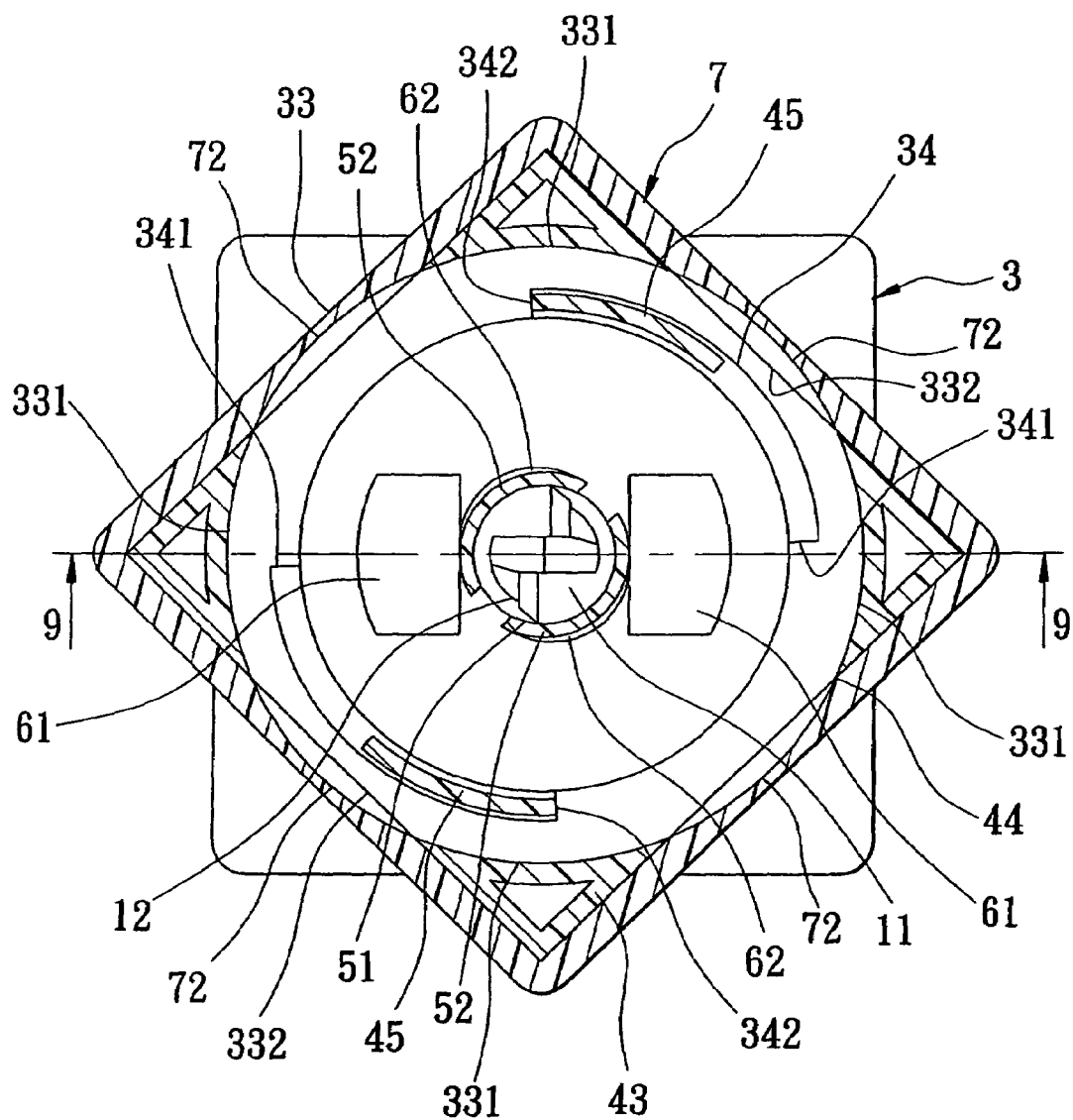
FIG. 8 is the same view as FIG. 5 but with the tubular clamp being placed in the second position.
Figure 9:
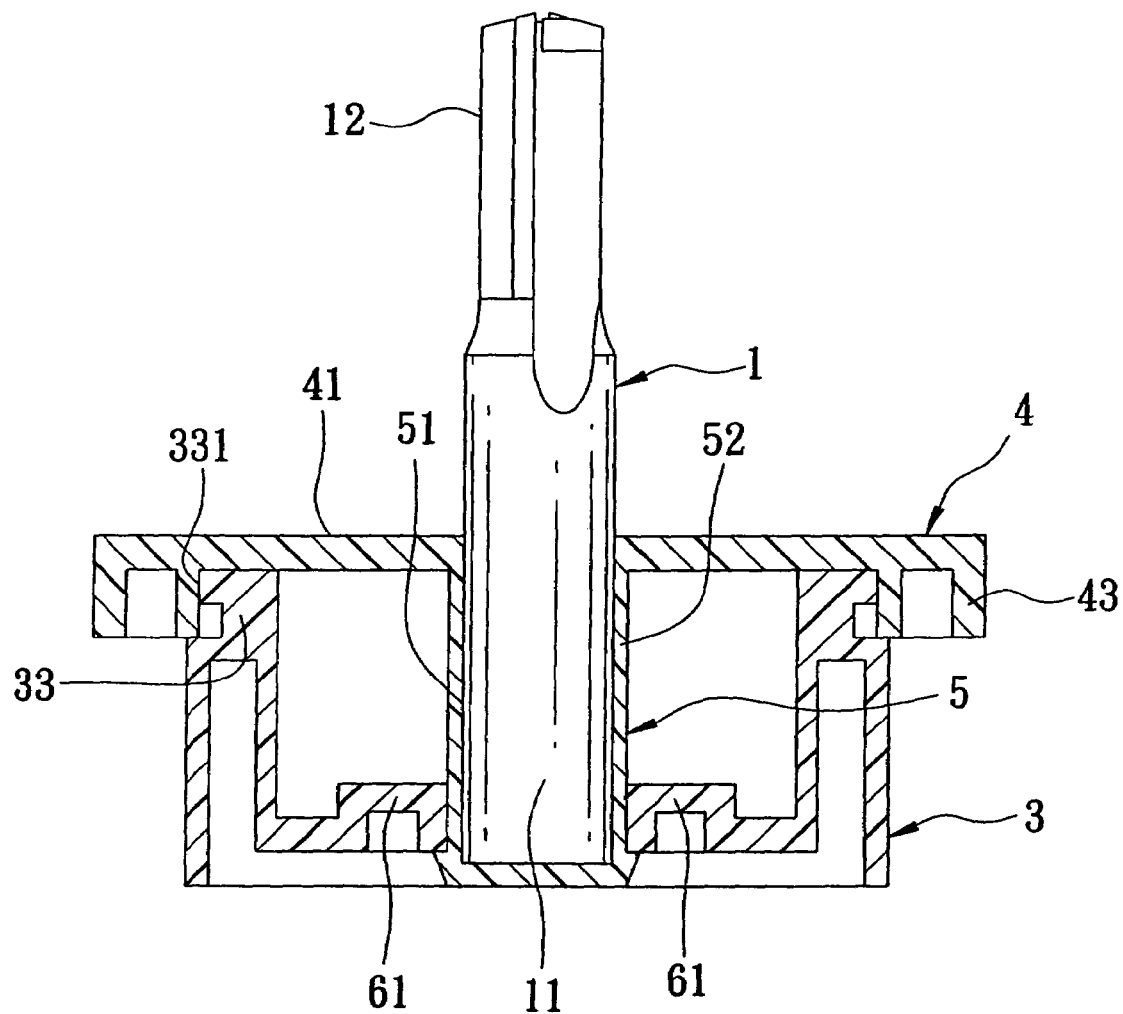
FIG. 9 is a sectional view taken along line 9-9 of FIG. 8.

When it is necessary to use the cutter 1, the cover plate 41 may be turned by rotating the casing 7 counterclockwise, as shown in FIG. 7. At this time, the arcuate slide ribs 45 are slid to the second ends 342 of the respective arcuate slide grooves 34 so that the tubular clamp 5 is rotated to a second position in which the protrusions 62 of the split parts 52 are moved away from the push blocks 61, as shown in FIGS. 8 and 9. The split parts 52 therefore move outward to enlarge the clamping hole 51 and to loosen the cutter 1. In addition, the flat chordal surfaces 332 of the ring member 33 are aligned with the respective notches 44 of the cover plate 41 so that the casing 7 may be detached from the cover plate 41. Note that, instead of using the casing 7, the cover plate 41 may also be turned directly by hand.

Figure 10:
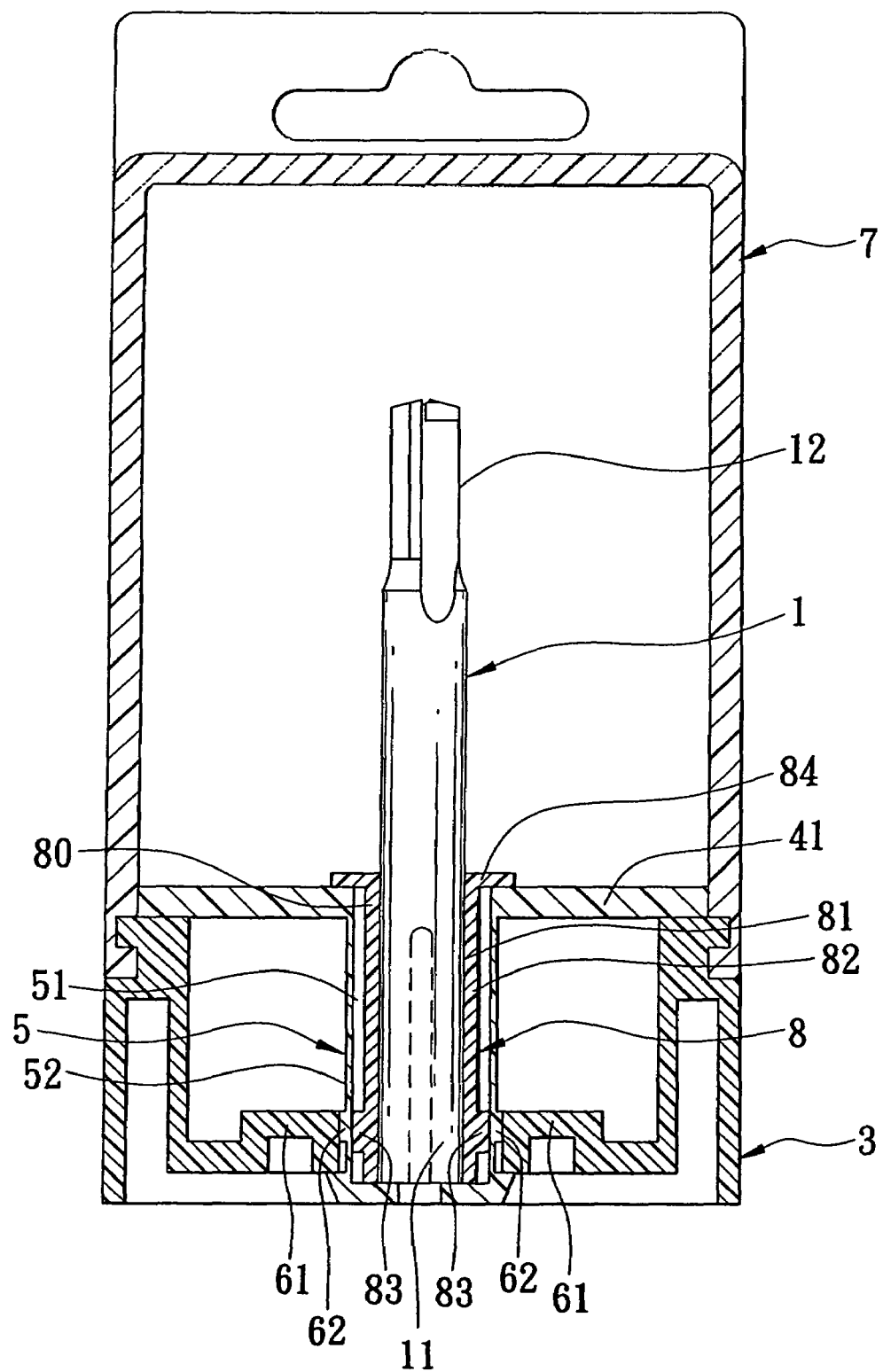
FIG. 10 is a sectional view of a tool holder according the second preferred embodiment of the present invention.

Referring to FIG. 10, according to the second preferred embodiment of the present invention, an auxiliary clamp 8 may be added to the tool holder of the previous preferred embodiment. The auxiliary clamp 8 has a clamping hole 81 with a size or diameter smaller than that of the clamping hole 51 of the tubular clamp 5 so that the auxiliary clamp 8 can be inserted into the clamping hole 51. A cutter may be inserted into the clamping hole 81 of the auxiliary clamp 8.

Like the tubular clamp 5, the auxiliary clamp 8 has a plurality of resilient split parts, for instance, a pair of split parts 82 which project axially downward from a tubular top portion 80 of the auxiliary clamp 8 and which are spaced apart angularly to define the clamping hole 81. The split parts 82 are provided respectively with press elements 83 at bottom ends thereof to abut against inner surfaces of the respective split parts 52 of the tubular clamp 5. Each press element 83 is located between one of the split parts 82 and a corresponding one of the split parts 5 of the tubular clamp 5. As such, the split parts 52 of the auxiliary clamp 8 are pressed when the split parts 52 of the tubular clamp 5 are pushed inward by the push blocks 61, and expand when the split parts 52 are released from the push blocks 61. An annular flange 84 is formed at a top end of the tubular top portion 80 of the auxiliary clamp 8 and proximate to the top end of the tubular clamp 5 to abut against the top side of the cover plate 41.

According to this preferred embodiment, a plurality of auxiliary clamps 8 having clamping holes 81 of varying sizes may be provided to accommodate different sizes of cutters or tools. The auxiliary clamps 8 may be inserted interchangeably into the tubular clamp 5.

While the protrusions 62 are provided respectively on the split parts 52 of the tubular clamp 5 in the first and second embodiments, the protrusions 62 may also be formed directly and respectively on opposite inner surfaces of the push blocks 61 in order to press the split parts 52 of the tubular clamp 5.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A tool holder comprising:

a base body having a through hole;

a tubular clamp rotatable between first and second positions, said tubular clamp including a plurality of axially extending split parts which extend through said through hole and which are spaced apart angularly to define a clamping hole that is adapted to receive a cutter, said split parts being resilient to move inward or outward; and a plurality of push elements formed on said base body, said push elements pushing said split parts inward when said tubular clamp is rotated to said first position, and releasing said split parts when said tubular clamp is rotated to said second position;

wherein said base body includes a bottom wall, said through hole extending through said bottom wall, said tubular clamp having a pair of said split parts, said push elements including a pair of push blocks that project upward from a top side of said bottom wall on two opposite sides of said through hole to push said split parts, respectively, when said tubular clamp is rotated to said first position.

2. The tool holder of claim 1, wherein each of said split parts has a bottom end formed with a barb that projects outwardly to engage a bottom side of said bottom wall, and a protrusion that projects outwardly from a respective one of said split parts on top of said bottom wall to be pushed by a respective one of said push blocks.

3. A tool holder comprising:

a base body having a through hole;

a tubular clamp rotatable between first and second positions, said tubular clamp including a plurality of axially extending split parts which extend through said through hole and which are spaced apart angularly to define a clamping hole that is adapted to receive a cutter, said split parts being resilient to move inward or outward; and a plurality of push elements formed on said base body, said push elements pushing said split parts inward when said tubular clamp is rotated to said first position, and releasing said split parts when said tubular clamp is rotated to said second position;

wherein the tool holder further comprises a rotary member for rotating said tubular clamp, said rotary member being connected integrally to said tubular clamp and coupled rotatably to said base body; and wherein said tubular clamp further has a top end, said base body further including a top wall extending above said through hole, and a ring member projecting upward from said top wall and coaxial with said through hole, said rotary member having a cover plate connected integrally with said top end of said tubular clamp and disposed on top of said top wall of said base body, said cover plate having an engaging unit projecting downward from said cover plate and connected rotatably to said ring member.

4. The tool holder of claim 3, wherein said ring member has an inner annular wall, and an outer peripheral wall, said inner annular wall having at least two spaced apart arcuate slide grooves that extend angularly and coaxially with said through hole, each of said arcuate slide grooves having first and second ends that are opposite angularly, said engaging unit having at least two spaced apart arcuate slide ribs projecting downward from said cover plate to engage slidably and respectively said arcuate slide grooves, each of said arcuate slide ribs being slidable to said first or second end of a respective one of said arcuate slide grooves to place said tubular clamp in said first or second position.

5. The tool holder of claim 4, further comprising a casing disposed on said cover plate to define a receiving space, said casing including a surrounding wall that has a bottom open end connected detachably to said cover plate.

6. The tool holder of claim 5, wherein said cover plate is four-sided and has four corners, said engaging unit further including four corner pieces that project downwardly and respectively from said four corners of said cover plate, each of said corner pieces having an angled corner wall, and an arcuate wall extending inwardly of and connecting with said angled corner wall, said bottom open end of said casing being fitted around said angled corner walls of said corner pieces, said arcuate walls of said corner pieces engaging slidably said outer peripheral wall of said ring member.

7. The tool holder of claim 6, wherein said outer peripheral wall has a plurality of spaced-apart arcuate surfaces, and a plurality of spaced-apart flat chordal surfaces between said arcuate surfaces, said arcuate surfaces extending angularly and coaxially with said through hole.

8. The tool holder of claim 7, wherein said cover plate further includes four notches each formed between two adjacent ones of said corner pieces, said arcuate surfaces of said outer peripheral wall being capable of projecting outward through said notches, respectively.

9. The tool holder of claim 8, wherein said bottom open end of said casing is four-sided and has four recesses to engage said arcuate surfaces, respectively.

* * * * *